Oct. 24, 1933.  H. S. NEWCOMER  1,932,082

PHOTOGRAPHIC OBJECTIVE

Filed May 18, 1932   2 Sheets-Sheet 1

INVENTOR.
Harry Sidney Newcomer
BY Hammond & Littell
ATTORNEYS

Patented Oct. 24, 1933

1,932,082

UNITED STATES PATENT OFFICE 1,932,082

PHOTOGRAPHIC OBJECTIVE

Harry Sidney Newcomer, New York, N. Y.

Application May 18, 1932. Serial No. 611,964

41 Claims. (Cl. 88—57)

This invention relates to photographic (or projection) optical systems of the type in which an anamorphoser is included as a part of the system and has for an object to provide an improved spherical lens for use between the anamorphorser and the object (or image) as a correcting lense to cause rays from the object to traverse the anamorphoser as pencils of parallel rays.

Anamorphosing objectives of the type used in optical systems as above indicated may be of two kinds, cylindrical objectives comprising suitably designed and suitably spaced cylindrical elements with their axes all parallel, and prism objectives comprising two prisms with their bases oppositely arranged, the median planes of the prisms forming a V. The magnification due to the anamorphoser is produced in a so-called "active plane", a plane perpendicular, in the first case to the axes of the cylindrical elements and in the second to the two planes of the V.

Improved anamorphosers of both types have been discussed in my co-pending applications for Letters Patent.

The general theory of such anamorphosing objectives has been discussed by Rudolf in the British Patent No. 8512 of 1898. As is there disclosed, when neither the image nor object is at a great distance from the anamorphoser it is desirable to place the anamorphoser between two spherical lens systems each having the focal length of the corresponding image distance. Since one image distance is usually much less than the other the lens on the former side has the relatively greater opening and is usually a suitably corrected ordinary photographic or projection objective. The lens on the side of the longer image distance is the one designated herein as the "correcting lens".

In the case of cylindrical anamorphosing objectives comprising cylindrical elements with their axes all parallel the necessity of such a correcting lens may be obviated by a focussing arrangement permitting the approximation of the elements when the object (as in photography) is nearer than "infinity".

There are, however, certain practical advantages in the use of a correcting lens even with an anamorphoser of this type.

In the case of the prism anamorphoser such a correcting lens is for all ordinary object distances practically a necessity. Such a lens, by making paraxial pencils traversing the prism anamorphoser pencils of parallel light, obviates the introduction of astigmatism which would result from the refraction of divergent or convergent pencils at the plane surfaces of the prisms. Thus, for objects (or images) at a lesser distance than infinity the refraction at oblique incidence on the plane refracting surfaces of the prisms of divergent or convergent pencils produces astigmatism of the pencils. This astigmatism increases with increasing angles of incidence and also with the nearness of the object (or image), i. e. with the increasing divergence or convergence of the pencils.

Correcting lenses as heretofore used with anamorphosers have been designed to correct the astigmatism of paraxial rays but have not satisfactorily corrected the astigmatism of diagonal rays with resultant poor definition at the margin of the image.

The present invention provides a correcting lens of such design that astigmatism arising in the system or at the correcting lens along diagonal rays, that is to say along incident pencils coming from non-axial points of the object, is more effectively avoided.

The nature and objects of the invention will be better understood from a description of selected illustrative embodiments thereof and an explanation of the principles involved for the purpose of which description and explanation reference should be had to the accompanying drawings forming a part hereof and in which.

Referring more particularly to the drawings there are illustrated not only anamorphosing optical systems in which there are provided spherical correcting lenses which when associated with suitable optical systems are designed in each case to give the least average astigmatism for the whole area of the image, but also certain relationships associated with the design of such a lens. The principles involved in the determination of the optimum cambrure of such lenses will be better understood from a consideration of the illustrative examples.

The correcting lens is associated with an anamorphoser and a photographic or projection objective. For convenience the anamorphoser may be considered to have, as in some cases it does have, a flat field. The photographic or projection objective rarely has a flat field, its tangential and sagittal focal surfaces curve in varying fashion out of the focal plane. To simplify the problem we will consider the photographic objective to have for the moment a flat field. Then if the correcting lens has a flat field, the marginal definition of the picture will not be interfered with by virtue of oblique astigmatism or failure to focus in the image plane.

The image surfaces of simple correcting lenses are in general far from being either flat or coincident. I have discovered that by choosing a suitable cambrure for the correcting lens suitable curvatures of its image fields may be obtained and the marginal imagery can be substantially improved.

Astigmatism of oblique rays introduced by correcting lenses increases only moderately with moderate variations of the cambrure of the correcting lens from the optimum but for most curvatures chosen at random the astigmatism thus introduced is so great as to cast a decidedly inferior definition at the margin.

Figure 1:
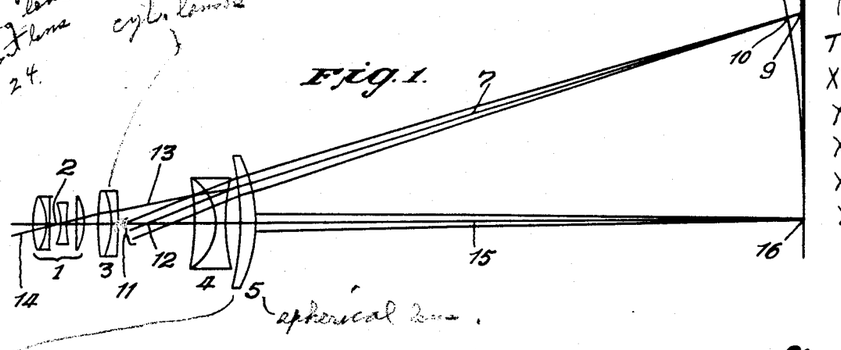
Figure 1 is a diagrammatic representation in longitudinal section of an optical system comprising a photographic objective, a cylindrical anamorphosing objective and a correcting lens embodying certain features of the invention.

The illustrative arrangement of Fig. 1, comprises an ordinary photographic (or projection) objective 1 with the stop at the position 2, an anamorphoser consisting of the positive cylindrical member 3 and the negative cylindrical member 4. In front of the anamorphoser is a correcting lens 5 designed in accordance with certain principles of the present invention.

The cylindrical members 3 and 4 are spaced a distance apart equal to the difference between their focal distances, that is with the anterior focal point of the positive member coinciding with the posterior focal point of the negative member, whereby paraxial pencils of parallel rays incident on the anamorphoser exit as pencils of parallel rays.

The correcting lens 5 is a spherical meniscus lens concave toward the anamorphoser, its focal length being equal to the object distance (anterior focal distance equal to the object distance). It follows that the anterior focal plane 6, of the lens is in the plane of the object. The front and back radii of the lens 5 are 34.4 mm. and 66.2 mm. respectively, its thickness 3.7 mm., index of refraction 1.52 and its strength is about 7.5 diopters.

The strength of the correcting lens should be such that its focal anterior distance is approximately equal to the distance from the correcting lens to the object plane (or the average object distance if there is variation), in order that the pencils of rays may pass through the anamorphoser as pencils of substantially parallel rays. Variations of $\frac{1}{18}$ diopter from the true distance seem to be tolerated in motion picture projection. In the projection of financial news at least twice this much is tolerated. The resulting astigmatism introduced by the anamorphoser is of course much less than this amount. The focus of the whole system is likewise thrown out by much less than this. For a mean focus correction or adjustment is made by shifting the ordinary photographic objective.

At 7, Fig. 1, I show an approximately homocentric pencil obliquely incident on the optical system 5, 4, 3, 1 and coming from points 9, 10, of the focal surfaces T17, S18 of the lens 5, near the margin of its image field. The pencil 7 on the refraction at the lens 5 becomes a pencil of parallel rays. If prolonged as the pencil 11, its central ray intercepts the axis of the lens 5, and of the system, in the point 12, and at an angle, for this example, of about 21°. The distance from the point 12 to the adjacent surface of the lens 5 may be called the "posterior intercept" or "intercept distance" for inclined pencils of parallel rays, and may conveniently be used as a factor of reference for the optimum form of the correcting lens 5. In this illustrative example it is 23 mm. The point 12 locates the position of the natural diaphragm of the lens 5. The pencil 7 is refracted by the cylindrical lenses 4 and 3, its central ray taking the position of the ray 13 within the anamorphoser and 14 to the left of the photographic objective 1 and passing through the center of the stop of the photographic objective at the point 2. The paraxial pencil 15 is of course homocentric. The pencil 7 as drawn is approximately homocentric. This pencil could readily have been made absolutely homocentric if in view of other factors involved this had been, as it might have been, an advantage. The pencil 15 converges to the point 16 in the object or focal plane 6. The oblique pencil 11, being by definition a pencil of parallel rays, is homocentric and on refraction at the lens 5 it becomes the pencil 7 whose character depends on the intercept distance 5 to 12, the strength of the lens 5 and its cambrure. For certain relationships of these factors the pencil 7 is homocentric and then converges to a point on coincident anterior focal surfaces. Such coincident surfaces are concave toward the lens and the anastigmatic focal point lies at a certain distance from the focal plane. In the illustrative example a 7½ diopter lens with 23 mm. intercept and 21° angle such distances from the focal plane would be about 6 mm. corresponding to a focusing error of about 0.31 diopters. Such a curvature might for some purposes be unobjectionable and the total freedom from astigmatism of oblique rays desirable. In the case of longer focus correcting lenses such as are more frequently employed, the curvature of field expressed in diopters is absolutely and frequently relatively less.

In the illustrative example, Fig. 1, at the expense of a certain lack of homocentricity (coincidence of anterior focal points) the field has been flattened as much as possible. The cambrure of the lens 5 is chosen so as to produce a tangential focal surface T17 which nearly coincides with the focal plane 6. The sagittal focal surfaces S18 is still appreciably concave toward the correcting lens, the sagittal focal point of the pencil 7 being about 4 mm. or 0.21 diopters from the focal plane.

Figure 2:
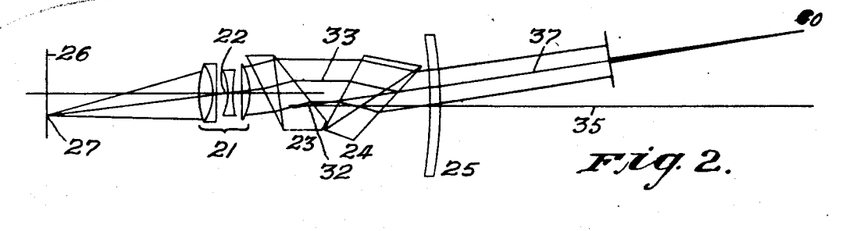
Figure 2 is a diagrammatic representation in longitudinal section of an optical system comprising a photographic objective, an anamorphosing prism objective and a correcting lens embodying certain features of the invention.

Figure 2 illustrates diagrammatically an optical system which is in general similar to that of Fig. 1, but in which the ordinary photographic objective 21 with its stop at the position 22 is combined with a prism anamorphoser consisting of the prisms 23 and 24 and in front of which the correcting lens 25 is placed.

The lens 25 is shown as a spherical meniscus lens of 0.2 diopter, the radii of curvature of the front and back surfaces of which are 400 mm. and 468 mm. respectively. In this Fig. 2, I have shown in longitudinal section parallel to an active plane the members of the anamorphosing prism objective traversed by a bundle of parallel rays whose central one is the ray 33. The bundle of parallel light 33, refracted at the various surfaces, is convergent in the point 27 of the focal plane 26 of the photographic objective 21 and at the extreme right it is homocentric and convergent in the point 40 on the anterior focal surfaces of the lens 25. Its central ray, indicated at 37, after refraction by the lens 25, when prolonged, intercepts the axis 35 of the lens 25 in the point 32, this pencil here constituting a bundle of parallel rays. The intercept distance in this illustrative example is 125 mm. The axis 35 on the expansion side, is displaced somewhat downward, toward the V of the anamorphosing prism objective, so as to be no longer in line with but nevertheless still parallel to the axis of the photographic objective 21. This lateral displacement of the axis on the expansion side is an inherent characteristic of prism anamorphosers. The pencil 37 is inclined at an appreciable angle to the axis of the systems, imaging a point 40 toward the margin of the object. The pencil is shown foreshortened in the drawings.

The anterior tangential and sagittal focal surfaces of the lens 25 are of substantially the same curvature and they are coincident at the point 40. This point is about 0.007 diopter short of the frontal plane passing through the axial focal point of the lens. By bending the lens so as to substantially increase the strength of its front surface (by about ½ diopter) the tangential image point could be pushed forward to the plane and the sagittal image to within about 0.005 diopter of the plane. As much more increase in cambrure would push the tangential image surface as much beyond the plane as the sagittal surface would be short of it, about 0.004 diopters. See Fig. 7.

Figure 3:
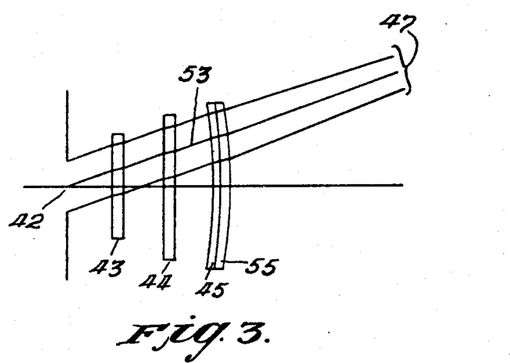
Figure 3 is a diagrammatic representation in longitudinal section perpendicular to the active plane of an anamorphosing prism objective and an achromatic correcting lens embodying certain features of the invention.

In Fig. 3, I have shown diagrammatically a similar arrangement except that the photographic objective is only shown schematically by the position of the center of its stop at 42 and also the longitudinal section is taken perpendicular to the active plane instead of parallel to it as in Figs. 1 and 2. The prism system 43, 44 comprises two simple thin prisms shown in rectangular section. The V of the prism anamorphoser is in front (or behind) the plane of the paper. At 45, 55, I have shown an achromatic meniscus correcting lens comprising a flint glass 45, and a crown glass 55 cemented together. The strength of this lens is ¼ diopter. The radii of curvature of the surfaces, front to back, and the thicknesses and indices of the glasses are $$r_1 = 172.5 \brace r_2 = 219.5} n_1 = 1.5400 \quad \nu = 59.6 \quad d_1 = 4.0$$
$$r_3 = 219.5 \brace r_4 = 188.0} n_2 = 1.6034 \quad \nu = 38.0 \quad d_2 = 2.5$$

The inclined pencil 47 is homocentric and after refraction at the lens 45, 55 it is a bundle of parallel rays 53 traversing the prisms 44, 43 and passing through the center of the stop 42 of the photographic objective, not shown. The intercept distance is 50 mm. The relations of the focal surfaces of the lens 45, 55 to the focal plane are similar to that described for the illustrative example of Fig. 2, and could be modified in the same manner.

In Figs. 1 and 2, the magnification due to the anamorphoser as illustrated is about 50% (1:1.5) and hence in the active plane, (the sections shown) the rays inclined to the axis and passing through the center of the stop of the photographic objective, when prolonged backward from the posterior surface of the correcting lens, cut the axis in a point at a less distance from the stop than the distance of the stop. The intercept distance is less than the stop distance, in fact it is equal to the "reduced" stop distance divided by the magnification ratio, in this instance 3/2. The "reduced" distance between any two points is equal to the sum of the distances in the respective media each divided by the corresponding index of refraction. The magnification ratio is, by definition, equal to the ratio of the dimensions of the anamorphosed to the non-anamorphosed image. If the glasses of the anamorphoser have zero thickness then the stop and intercept distances are proportionate to the magnification. Correction for thickness is made by substituting reduced distances for actual distances. In Fig. 1, the distance of the point 12 from the lens 5 is a reduced distance as the presence of the lens 4 is ignored so far as the pencil 11 is concerned.

Figures 1 and 2 primarily illustrate the conditions to be considered when designing correcting lenses where the correction of oblique pencils in the active plane is more important than in the inactive plane, for instance because the angular field is greater.

The oblique astigmatism and the distances of the curved focal surfaces from the focal plane of a simple correcting lens in general increase with the amount of the obliquity approximately as the square of the angle. If the astigmatism or other field curvature defect be annuled for any given angle then it will not be zero at lesser or greater angles but the deviation from zero is less for lesser angles. It is therefore usually advisable to correct for the maximum angle if an optimum correction is desired.

In Fig. 3, the situation in the inactive plane of the anamorphoser is depicted. The intercept distance is equal to the reduced stop distance.

In some projecting systems the image fields have much greater angular extension in the inactive than the active plane and hence the correction for inclined pencils in the inactive plane is more important. Figure 3 illustrates such a situation.

An achromatic correcting lens is depicted in Fig. 3, by way of illustration. It has at the same time certain structural properties common to the correcting lenses of Figs. 1 and 2 and presently to be described.

I have discovered that the marginal portions of the images due to optical systems of the nature described can be much improved by a suitable choice for the cambrure of the correcting lens. The cambrure may be defined as being numerically equal to the algebraic difference between the strengths in diopters of the front and back surfaces of a simple lens. As a convenient practical method the cambrure of a lens of known strength can be determined by fixing the curvature of the front surface. The optimum curvature depends on the strength of the lens and the intercept distance. To a lesser extent it depends on the thickness of the lens, the maximum angle for which it is corrected and the index of refraction of the glass. The appropriate first surface curvatures for correcting lenses of strength ordinarily employed with anamorphosers bear a fairly constant proportional relationship to the intercept distance, astigmatism increasing only moderately with slight deviations from the optimum but nevertheless being relatively enormous for most curvatures chosen at random. Ordinarily the radius of curvature of the front surface of the correcting lens is best less than ⅓ and certainly never more than ½ the distance of the object (or image).

When conditions of optimum correction require a substantial flattening of the tangential image surface of the correcting lens and corresponding reduction in the curvature of its sagittal surface appropriate curvatures or strengths of the front surface of the lens are greater and while the flattening is substantially at an optimum over an appreciable range of curvatures these curvatures are about the same for all strength lenses, varying only with the intercept distance.

Figure 4:
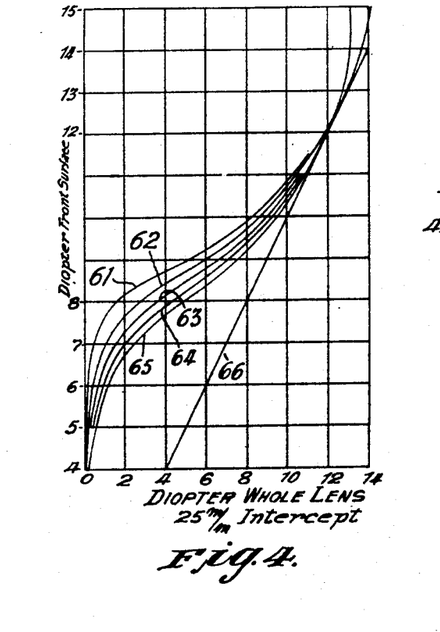
Figure 4 shows graphs indicating the curvature in diopters of the front surface for correcting lenses of different thicknesses having varying strengths in diopters and certain other special relationships with respect to the associated optical system, whereby oblique homocentric pencils remain homocentric after refraction.

In Fig. 4 I have shown a graph representing by the curves 61, 62, 63, 64, 65, the best curvatures of the front surfaces of correcting lenses of thicknesses 1, 2, 3, 4, 5, mm. respectively and of various strengths 0 to 14 diopters corrected for astigmatism of inclined rays, all having intercept distances equal to 25 mm. (posterior surface of lens to point of intersection with the axis of inclined pencil of parallel rays). The curvatures of the front surfaces of the various lenses are expressed in terms of their strengths in diopters. The range of the graphs is from 4 to 15 diopters for strength of the front surfaces. The strength of lens will depend upon the average object distance for which the system is to be used, the focal length being substantially equal to the object distance.

The above graphs 61 to 65 pass smoothly through the following coordinate points:

(4.0,.01), (6.0,.2), (7.0,.45), (7.65,1.0), (8.14,2.0), (8.7,4.0), (9.2,6.0), (9.85,8.0), (10.85,10.0), (12.1,12.0), (14,13.8);
and
(4.0,.02), (6.0,.41), (7.0,1.0), (7.65,2.0), (8.07,3.0), (8.4,4.0), (8.95,6.0), (9.66,8.0), (10.7,10), (12.05,12), (13.05,13) (15,14.1);
and
(4.0,.04), (6.0,.63), (7.0,1.6), (7.74,3.0), (8.1,4.0), (8.73,6.0), (9.5,8.0), (10.6,10.0), (12.03,12);
and
(4.0,.07), (6.0,.9), (7.0,2.0), (7.88,4.0), (8.5,6.0), (9.35,8.0), (10.48,10.0), (12.01,12);
and
(4.0,.10), (6.0,1.18), (6.76,2.0), (7.65,4.0), (8.33,6.0), (9.2,8.0), (10.35,10.0), (12.0,12.0), (13.0,12.7), (14.0,13.1), (15.0,13.15) respectively, wherein for each coordinate point, the first figure within the parenthesis represents the ordinate giving the strength of the front surface in diopters, and the second figure within the parenthesis represents the abscissa giving the strength of the whole lens in diopters, all for lenses in which the dimensions have been reduced proportionally to the ratio of the true intercepted distance to an intercept distance of 25 millimeters.

It is obvious that given any required strength, thickness and intercept distance a proper anastigmatic lens can be taken from the graph, multiplying the data of the appropriate graph locus by the necessary factor to bring 25 mm. to the required intercept distance. Thus a 2 diopter lens of 75 mm. intercept distance is the 6 diopter lens of the graph with its radii multiplied by 3. The lenses of the graph are corrected for an inclination of 20° of the pencil of parallel rays to the axis. This is an average extreme angle for many purposes for which these anamorphosers and correcting lenses are used. The rays inclined at a lesser angle than 20° will not be perfectly corrected but the correction is sufficient to provide entirely satisfactory results. Lenses perfectly corrected for a lesser angle have slightly stronger front surfaces but the difference is not appreciable and the error to be corrected is negligible, that is, the astigmatism of the lenses shown for rays inclined less than 20 is negligible. For greater angles a perfect correction, the best average correction for all intermediate angles including the maximum, are lenses with somewhat weaker front surfaces. Again the difference is not great. At 30° the appropriate strength of the front surfaces is roughly one third diopter less.

At 66 I have drawn a straight line representing the locus of lenses whose back surface is flat. Lenses represented by points below this line, i. e., whose back surface are convex, have when used in the manner here described so much astigmatism and curvature of their marginal fields as to be useless when used for the purposes described. As a matter of practical consideration the lenses shown having greater strengths than 8 diopters or any derivative of such lenses are rarely useful for the purposes described. The line 66 and a vertical at 8D therefore limit the right hand and lower margin of an area within which satisfactory lenses or their derivatives lie. A 7½ diopter lens was chosen for Figure 2 largely so that a scale drawing could be made in the space available.

Figure 4 illustrates the cambrures of correcting lenses free from astigmatism along oblique rays. These rays focus short of the anterior focal plane of the lens. The amounts of such deviation from the focal plane has been indicated in a number of illustrative examples. Attention has also been called to the fact that decreasing the cambrure not only introduces an astigmatism of oblique rays, which rapidly becomes considerable in amount, but also substantially increases the curvature of both focal surfaces. Increasing the cambrure introduces a moderate amount of astigmatism but flattens the focal surfaces and in many instances reverses the curvature of the tangential focal surface and sometimes of the sagittal focal surface.

In many instances a correcting lens which is substantially anastigmatic for oblique rays is desirable. Fig. 4 gives the data from which such lenses may be calculated.

For practical purposes the solution defining radius of curvature of the front surface of a substantially anastigmatic correcting lens may be taken as independent of the index of refraction and equal to 2.3 times the distance from the lens to the point at which the inclined refracted ray cuts the axis of the lens. This value approximates that given by the data of Fig. 4 for a 25 mm. intercept distance lens of 6 diopters strength and all lenses derived therefrom by use of a multiplying factor. The average front radius factor should be 10% larger or about 2.5 when applied to 25 mm. intercept distance lenses down to 2 diopters strength or to derivatives of such lenses. Many correcting lenses in practical use have intercept distances appreciably greater than 25 mm. and hence the range 2 to 6 diopters covers many lesser strength lenses ordinarily in use, as for instance in the projection of financial news. The front surface radius factor should be 50% larger for a ¼ diopter 25 mm. intercept distance correcting lens. There are obviously variations for these factors due to lens thickness variations.

Figures 5, 6, 7:
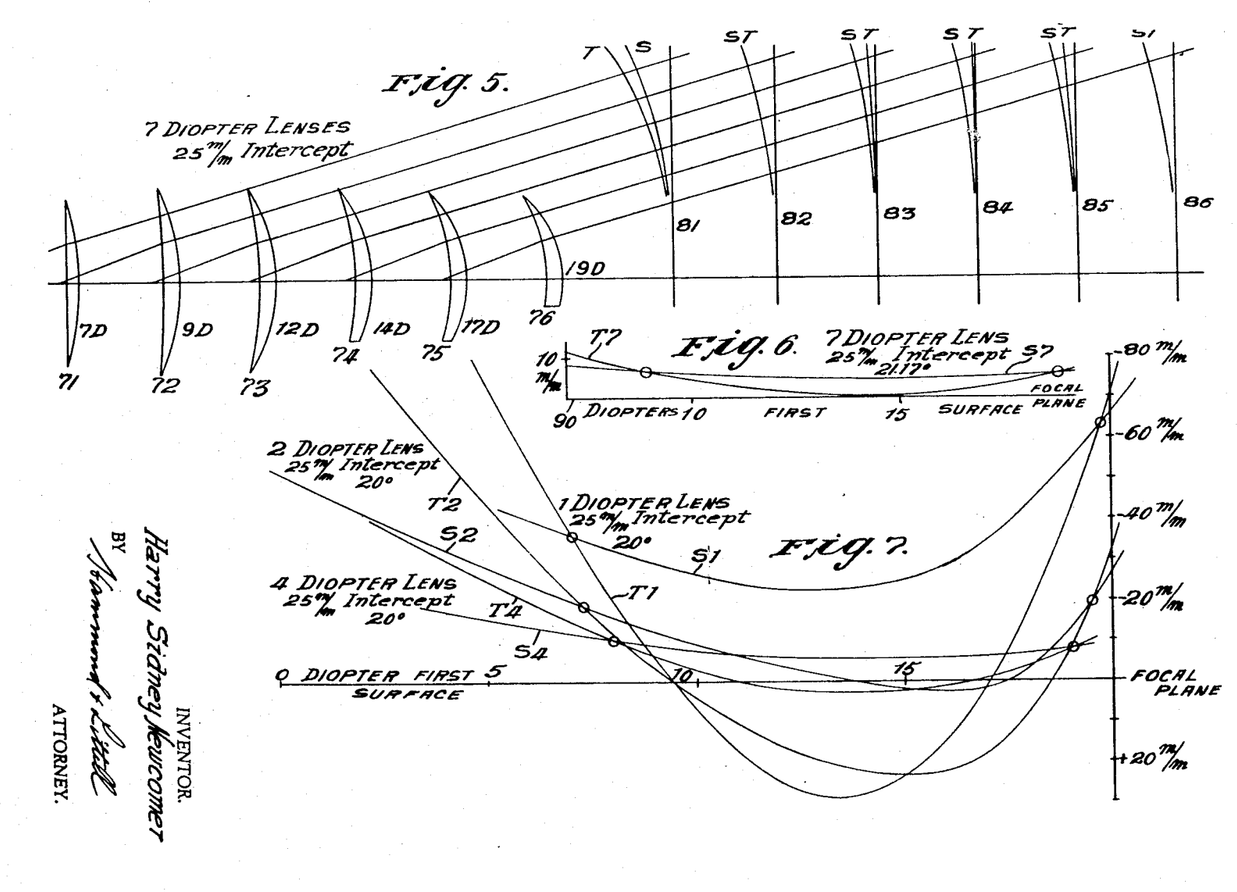
Figure 5 shows a series of simple lenses of the equal strengths but of different cambrures, i. e. strengths of front surfaces, together with their respective anterior image surfaces and focal planes.
Figure 6 is a plot showing deviation of the image surfaces from the focal plane for a series of such lenses.
Figure 7 is a similar plot for three other series of certain strengths.

In Fig. 5 at 71, 72, 73, 74, 75 and 76 I show in longitudinal section a series of 7 diopter lenses having front surfaces of 7, 9, 12, 14, 17 and 19 diopters respectively. The thickness of lens 71 is 3 mm., of the others 4 mm. The posterior intercept distances and angles of inclination of the rays are in each instance 25 mm. and 21.17°. At 81, 82, 83, 84, 85 and 86, I show the anterior focal planes and the tangential and sagittal focal surfaces T and S of these lenses. Lens 74 having a 14 diopter front surface, has the flattest tangential and sagittal focal surfaces. Either greater or lesser strength of the front surface gives increased concavity of both surfaces, that of the tangential focal surface increasing more rapidly than that of the sagittal focal surface with change in cambrure. In the case of lenses 72 and 76 the surfaces are approximately coincident. In the case of lens 71 having a flat posterior surface the concavity of both surfaces, and particularly of the tangential surface is sufficiently marked to cause a considerable refractive error along oblique rays.

In Fig. 6 I plot the concavity or curvature of these focal surfaces with continuous variations in cambrure, from 7 to 19 diopters front surface, the concavities being measured by the distances in millimeters of the focal points of the 21.17° oblique rays from the focal plane. Distances up in the figure are measured from the focal plane 90 towards the lens and are represented as having negative values. The posterior intercept distance of the parallel beam is 25 mm.

At S7 I plot the sagittal locus and at T7 I plot the tangential locus. The sagittal focal point never reaches the focal plane for any cambrure. The tangential focal point nearly reaches the focal plane over a wide range of cambrures, for instance from 12 to 17 diopters front surface.

All cambrures beginning with values in the vicinity of the lower anastigmatic value and extending to the upper anastigmatic value represent lens types which when used in combination with one or another of the anamorphoser and ordinary objective types make desirable optical combinations. Correcting lenses with flat or convex posterior surfaces make undesirable combinations.

In Fig. 7 I plot to the same scale over a range from 0 to 20 diopters strength of front surface, the loci of the distances in millimeters from the focal plane of the focal points along 20° oblique rays for lenses of three strengths. S1 and T1 are the loci for a 1 diopter lens, S2 and T2 for a 2 diopter lens and S4 and T4 for a 4 diopter lens. For convenience in identifying pairs of curves for a single strength lens circles are placed at their intersection points. These circles represent the anastigmatic values for such lenses.

The curves are concave upward and distances upward from the focal plane are toward the lens and are given negative values. All of the curves are drawn to the same millimeter scale. The relative distances for the various strength lenses are more nearly equal than the absolute distances shown in the graphs, that is to say, the distances of the focal points from the focal plane would be nearly equal if the focal lengths were reduced to the same scale, for instance unity.

Curves are drawn for a sufficient number of different strength lenses to give a mental picture of the character of the focal surfaces of possible correcting lenses. Lenses which are strong in relation to intercept distances (as in Fig. 6) have both focal surfaces concave towards the lens, but for certain cambrures as shown the tangential focal surface is nearly flat and the sagittal focal surface has a minimum curvature.

When the intercept distance remains constant, as in the graphs, as the strength decreases, both image surfaces become less concave, the tangential focal surface being the first to become convex toward the lens. Thus for the 4 diopter lens, Fig. 7, it lies distal to the focal plane for front surfaces 11 to 16½ diopters. Lenses of still less strength, have convex sagittal as well as tangential focal surfaces for certain cambrures, (2 diopter lens, Fig. 7). Still weaker lenses have again greater concavity of the focal surfaces toward the lens. Thus the 1 diopter lens of Fig. 7 has, within the useful front surface range, 7 to 20 diopters absolutely and relatively greater distances of the sagittal surface from the focal plane. The maximum convexity of the tangential surface is, as measured in millimeters from the focal surface along the oblique rays, not much more than that of the 2 diopter lens. Relatively it is much less.

As has already been described the choice of strength of lens to be taken from the data lenses of this specification depends not only upon the definitive strength of the converted lens, i. e., the lens to be used, but also upon the intercept distance. For given conditions it is thus not possible to arbitrarily choose a lens from the most appropriate of the series such as are depicted in Fig. 7. The ultimate strength and intercept distance of the lens to be chosen will determine which of the series 1, 2, 4, 7, diopter or other definite one, intermediate or otherwise, of such a series is suitable. From this appropriate series a cambrure, or strength of the first surface, such that optimum focal surface, curvatures are secured, may be selected.

Thus in Fig. 1 it was indicated that a flat tangential focal surface could be a desideratum. Referring to Fig. 6 such lenses, for 25 mm. intercepts, have front surface strengths ranging from 13 to 16 diopters. The 7½ diopter lens (23 mm. intercept) of Fig. 1 is about 8% stronger and thus has a front surface range of about 14 to 17½ diopters.

If the lens were somewhat weaker in proportion to its intercept distance it would be possible to choose a cambrure making the tangential focal surface flat or even convex towards the lens. Indeed various relationships between the two surfaces are possible and may be selected to suit the best operating conditions for the system as a whole. Thus in some instances a desirable and possible solution may be one in which both focal surfaces are convex toward the lens. Again it may be preferable to have the tangential convex and the sagittal concave so that the mean curvature is approximately zero. Again it is obvious that for certain purposes freedom from astigmatism is more important than minimum curvature of field. Then the cambrure corresponding to equal focal surfaces may be chosen, (Fig. 4).

It is particularly important that, in optical systems of the type discussed, the refracted pencils are composed of substantially parallel rays on the same side of the correcting lens as the "intercept." This fact determines a peculiar type of correcting lens and as I have discovered makes possible anastigmatic corrections over a considerable strength range, I have discovered that the fact that these lenses are to be used with optical systems whose image fields are often not in themselves flat permits and makes desirable the choice of correcting lenses with fields curved so as to partly or largely neutralize the existing curvatures of field due to other elements of the system and thus improve the definition for that reason alone. Such lenses will in general, as the circumstances require, have cambrures greater than that of the lower cambrured anastigmatic lens. They can be suitably chosen by interpolation from the curves of Figs. 6 and 7.

If the correcting lens has much less cambrure than the smallest cambrure giving an anastigmatic solution the curvatures of the focal surfaces become objectionably large. When the cambrure is equal to the strength of the lens, that is when the back surface of the correcting lens is flat, this curvature is so large as to introduce an impracticably large amount of refractive error into the system for oblique rays (see 81 Fig. 5). If the back surface of the correcting lens be convex this error is even greater.

As will be seen from Fig. 4, the cambrure giving a definite solution varies with the thickness of the lens. In transposing from data lenses the specification to definitive lenses the thicknesses are also subject to multiplication by the transposition factor and must be selected with this modification in mind. The curves of Figures 6 and 7 are shifted with respect to the diopters first surface axis with changes in thickness, the displacements being such as to move the anastigmatic points in the manner indicated by the data of Fig. 4. The curves as drawn correspond to 4 mm. lens for Fig. 6, and 3.5 mm., 3 mm. and 2 mm. lenses for the 4, 2, and 1 diopter curves of Fig. 7.

All of the data in this specification refer to a mean index of refraction equal to 1.52. This is an index commonly in use for simple lenses. The data apply equally qualitatively for other indices of refraction but involves a shift of the curves with respect to the diopters first surface axis, namely upward for increasing index. The amount of the shift of the lower anastigmatic point is about 0.2 diopter for each 0.01 of index. The distance along the diopters first surface axis between the two anastigmatic points (Figs. 6 and 7) is at the same time increased by increasing the index. The shift of the upper anastigmatic point is about 0.35 diopter for each 0.01 of index.

It will be seen from a study of the conditions in Figs. 1, 2 and 3 that the best intercept distance to choose in picking a lens from the graph of Fig. 4, or by interpolation from the graphs of Figs. 6 and 7 will depend on the conditions of the optical system. The intercept distance to be used will depend upon whether the angle is markedly greater in one meridian or another (active or inactive plane). In some cases it will be desirable to select as a basis for determination of cambrure and lens strength an intercept distance intermediate between those indicated by the conditions of Figs. 2 and 3.

In some instances the intercept distance in projection systems may be determined by the nature of the cone of light from the condenser. The point of the caustic of the projection cone may for instance be behind, or more likely in front of the projection lens and thus in the latter case, decrease the intercept distance because the stop of the system is shifted to the front by the nature of the caustic of the projection beam. In any case correcting lenses for anamorphosing systems should have surfaces concave toward the anamorphoser.

By interpretation of Figs. 6 and 7 it will be seen that for lenses of the strength and intercept distance diagrammed optimum freedom from astigmatism is obtained by selecting the first surface strength as approximately 7 to 9 diopters or 18 to 20 diopters representing the lesser and greater anastigmatic cambrures. The optimum flatness of field may be obtained by selecting the first surface curvature approximately within the range of 5 to 20 diopters and more especially within the range 8 to 18 diopters.

As indicated in the discussion of Fig. 4, if the intercept distance is greater than 25 millimeters the particular diagrams should be read as relating to correspondingly weaker lenses and the strength of the front surface should be read as correspondingly less. For convenience we may say, for example, that the strength of the front surface should be within the range 5 to 20 diopters multiplied by the ratio 25 divided by the actual intercept distance which is the equivalent of 125 to 500 divided by the intercept distance.

For convenience of description in the claims, the distance from the front face of the correcting lens to the object in case the objective is used for photographic purposes or of the image in case the objective is used for projection will be defined as "the object distance".

The foregoing particular description is illustrative merely and is not intended as defining the limits of the invention.

This application is a continuation in part of my application for Letters Patent, Serial No. 382,681, filed August 1, 1929. It represents in part certain improvements over the arrangements described in that application.

I claim:

1. An optical system for photographic or projection purposes comprising, in combination, a photographic lens or real image forming system, an anamorphosing unit in front of the photographic lens, and in front of the anamorphosing unit a single element correcting lens with a focal length approximating the object distance having both surfaces concave toward the anamorphoser.

2. An optical system for photographic or projection purposes comprising, in combination, a photographic lens, an anamorphosing unit in front of the photographic lens, and in front of the anamorphosing unit an achromatized correcting lens with a focal length approximating the object distance, having its free surfaces concave toward the anamorphoser.

3. An optical system for photographic or projection purposes comprising, in combination, a photographic lens or real image forming system, an anamorphosing unit in front of the photographic lens, and in front of the anamorphosing unit a correcting lens, corrected for astigmatism of oblique rays, with its free surfaces concave toward the anamorphosing unit and having a focal length approximating the object distance.

4. An optical system for photographic or projection purposes comprising, in combination, a photographic lens, an anamorphosing unit in front of the photographic lens, and in front of the anamorphosing unit a single element correcting spherical lens having a focal length approximating the object distance, the radius of curvature of the front surface of the correcting lens being substantially two to four times the distance from the correcting lens to the photographic objective thereby giving the correcting lens a cambrure such that the correcting lens is approximately anastigmatic for marginal inclined rays.

5. An optical system comprising, in combination, a real image forming system, an anamorphosing unit in front of this system, and in front of this anamorphoser a correcting lens with a focal length approximating the object distance and having a radius of curvature of the front surface approximately equal to 2.3 times the distance from the lens to the point on its axis where the principal ray of a bundle of inclined rays incident on the front surface of the lens cuts this axis after refraction by the lens.

6. An optical system comprising, in combination, a real image forming system, an anamorphosing unit in front of this system, and in front of this anamorphoser a correcting lens with a focal length approximating the object distance and having a radius of curvature of the front surface approximating two and a half to three times the distance from the lens to the point on its axis where the principal ray of a bundle of inclined rays incident on the front surface of the lens cuts this axis after refraction by the lens.

7. An optical system for photographic or projection purposes comprising, in combination, a photographic lens, an anamorphosing unit in front of the photographic lens, and in front of the anamorphosing unit a correcting spherical lens with its free surfaces concave toward the anamorphoser, having a focal length approximating the object distance, the radius of curvature of the front surface of the correcting lens being less than one-half the object distance.

8. An optical system for photographic or projection purposes comprising, in combination, a photographic lens, an anamorphosing unit in front of the photographic lens, and in front of the anamorphosing unit an achromatized correcting lens with only two free surfaces and with a focal length approximating the object distance and having front and back surfaces concave toward the anamorphoser, the radius of curvature of the front surface of the correcting lens being less than one-half the object distance.

9. An optical system for photographic or projection purposes comprising, in combination, a photographic lens or real image forming system, an anamorphosing unit in front of the photographic lens, and in front of the anamorphosing unit a single element correcting lens with a concave back surface having a focal length approximating the object distance and having a front surface strength equal to 125 to 500 diopters divided by the number representing the length in millimeters of the intercept distance.

10. An optical system for photographic or projection purposes comprising, in combination, a photographic lens or real image forming system, an anamorphosing unit in front of the photographic lens, and in front of the anamorphosing unit a single element correcting lens with a concave back surface having a focal length approximating the object distance and having a front surface strength equal to 225 to 450 diopters divided by the number representing the length in millimeters of the intercept distance.

11. An optical system for photographic or projection purposes comprising, in combination, a photographic lens, an anamorphosing unit in front of the photographic lens, and in front of the anamorphosing unit a single element correcting lens having a focal length approximating the object distance and having both faces concave toward the anamorphoser with the front surface of a strength approximately equal to 100 to 225 diopters divided by the number representing the length in millimeters of the intercept distance.

12. An optical system for photographic or projection purposes comprising, in combination, a photographic lens or real image forming system, an anamorphosing unit in front of the photographic lens, and in front of the anamorphosing unit an achromatized correcting lens with a focal length approximating the object distance, having only two free surfaces, both surfaces being concave toward the anamorphoser and having a front surface strength equal to 125 to 500 diopters divided by the number representing the length in millimeters of the intercept distance.

13. An optical system for photographic or projection purposes comprising, in combination, a photographic lens or real image forming system, an anamorphosing unit in front of the photographic lens, and in front of the anamorphosing unit an achromatized correcting lens with a focal length approximating the object distance, having only two free surfaces, both surfaces being concave toward the anamorphoser and having a front surface strength equal to 225 to 450 diopters divided by the number representing the length in millimeters of the intercept distance.

14. An optical system for photographic or projection purposes comprising, in combination, a photographic lens, an anamorphosing unit in front of the photographic lens, and in front of the anamorphosing unit an achromatized correcting lens with a focal length approximating the object distance, having only two free surfaces, both surfaces being concave toward the anamorphoser, and having a front surface of a strength approximately equal to 100 to 200 diopters divided by the number representing the length in millimeters of the intercept distance.

15. An optical system for photographic or projection purposes comprising, in combination, a photographic lens or real image forming system, an anamorphosing unit in front of the photographic lens, and in front of the anamorphosing unit a correcting lens with a focal length approximating the object distance and having both front and back surfaces concave toward the anamorphoser, the front surface of the lens having a strength in diopters within the range 7 to 17 multiplied by 25 and divided by the intercept distance expressed in millimeters.

16. An optical system comprising, in combination, a real image forming system and in front thereof a single element correcting lens with both surfaces concave toward the system having a focal length approximating the object distance, and having a front surface with a strength in diopters approximating the product of the fraction, 25 divided by the intercept distance of the lens expressed in millimeters, and the algebraic sum of the number 8, the number designating one-fourth the strength of the lens expressed in diopters, and the number resulting from the quotient of minus one times the thickness of the lens expressed in millimeters divided by the strength of the lens expressed in diopters.

17. An optical system comprising, in combination, a real image forming system and in front thereof an achromatized correcting lens with only two free surfaces and with a focal length approximating the object distance, having front and back surfaces concave toward the system and having a front surface with a strength in diopters approximating the product of the fraction, 25 divided by the intercept distance of the lens expressed in millimeters, and the algebraic sum of the number 8, the number designating one fourth the strength of the lens expressed in diopters, and the number resulting from the quotient of minus one times the thickness of the lens expressed in millimeters divided by the strength of the lens expressed in diopters.

18. An optical system for photographic or projection purposes comprising, in combination, a photographic lens or real image forming system, an anamorphosing unit in front of the photographic lens and in front of the anamorphosing unit a correcting lens with only two free surfaces and a focal length approximating the object distance, and having both front and back surfaces concave toward the anamorphoser, the front surface of the lens having a strength in diopters approximating the product of the fraction, 25 divided by the intercept distance of the lens expressed in millimeters, and the algebraic sum of the number 8, the number designating one-fourth the strength of the lens expressed in diopters, and the number resulting from the quotient of minus one times the thickness of the lens expressed in millimeters divided by the strength of the lens expressed in diopters.

19. An optical system for photographic or projection purposes comprising, in combination, a photographic lens, an anamorphosing unit in front of the photographic lens, and in front of the anamorphosing unit a correcting spherical lens with its free surfaces concave toward the anamorphoser and having a focal length approximating the object distance, the front surface of the correcting lens having a strength in diopters approximately equal to between 9 and 15 multiplied by 25 and divided by the number of millimeters in the intercept distance, thereby to cause the tangential image surface of the correcting lens to be approximately plane.

20. An optical system for photographic or projection purposes comprising, in combination, a photographic lens, an anamorphosing unit in front of the photographic lens, and in front of the anamorphosing unit a correcting spherical lens with its free surfaces concave toward the anamorphoser and having a focal length approximating the object distance, the front surface of the correcting lens having a strength in diopters approximately equal to between 10 and 16 multiplied by 25 and divided by the number of millimeters in the intercept distance thereby to cause the sagittal image surface of the correcting lens to be approximately plane.

21. An optical system for photographic or projection purposes comprising, in combination, a photographic lens, an anamorphosing unit in front of the photographic lens, and in front of the anamorphosing unit a correcting spherical lens with its free surfaces concave toward the anamorphoser and having a focal length approximating the object distance, the front surface of the correcting lens having a strength in diopters approximately equal to between 10 and 15 multiplied by 25 and divided by the number of millimeters in the intercept distance thereby to cause the mean of the tangential and sagittal focal surfaces to be approximately plane.

22. An optical system for photographic or projection purposes comprising, in combination, a photographic lens, an anamorphosing unit in front of the photographic lens, and in front of the anamorphosing unit a correcting spherical lens with its free surfaces concave toward the anamorphoser and having a focal length approximating the object distance, the front surface of the correcting lens having a strength in diopters approximately equal to between 10 and 15 multiplied by 25 and divided by the number of millimeters in the intercept distance thereby to cause the focal surfaces to be substantially plane but deviating from the exact plane so as substantially to neutralize the curvatures of the image surfaces of the balance of the optical system.

23. An optical system comprising, in combination, a real image forming system and in front thereof a single element correcting lens with both surfaces concave toward the system, having a focal length approximating the object distance, and having a front surface with a strength in diopters approximating the product of the fraction, 25 divided by the intercept distance of the lens expressed in millimeters, and the algebraic sum of the number 7½, ⅕ the number of hundredths over and above 150 in the value of the index of refraction of the glass of the lens, the number designating one fourth the strength of the lens expressed in diopters, and the number resulting from the quotient of minus one times the thickness of the lens expressed in millimeters divided by the strength of the lens expressed in diopters.

24. A series of meniscus correcting lenses of focal lengths approximating object distances, for use singly in combination with a real image forming system, the back surfaces of the correcting lenses being concave toward the image forming system, the front surfaces of the correcting lenses having a strength in diopters approximating the product of the fraction, 25 divided by the distance in millimeters from the correcting lens to its natural diaphragm, and the algebraic sum of the number 8, the number designating one fourth the strength of the lens expressed in diopters, and the number resulting from the quotient of minus one times the thickness of the lens expressed in millimeters divided by the strength of the lens expressed in diopters.

25. A meniscus correcting lens of focal length approximating the object distance, for use in combination with a real image forming system, the back surface of the correcting lens being concave toward the image forming system, the front surface of the correcting lens having a strength in diopters approximating the product of the fraction, 25 divided by the distance in millimeters from the correcting lens to its natural diaphragm, and the algebraic sum of the number 8, the number designating one-fourth the strength of the lens expressed in diopters, and the number resulting from a quotient of minus one times the thickness of the lens expressed in millimeters divided by the strength of the lens expressed in diopters.

26. A meniscus correcting lens of focal length approximating the object distance, for use in combination with a real image forming system, corrected for astigmatism of oblique rays, with its free surfaces concave toward the image forming system, in which the strength of the front surface of the correcting lens, expressed in diopters, is obtained graphically from a graph in which the strength of the front surface is plotted against the strength of the whole lens, both expressed in diopters, and in which when the dimensions of the lens are all reduced proportionally to the ratio of the true intercept distance to an intercept distance of 25 millimeters, then according as the thickness of the reduced lens is 1, 3, or 5 millimeters or a value proportionate thereto, the graph passes smoothly through the set of coordinate points (4.0,.01), (6.0,.2), (7.0,.45), (7.65,1.0), (8.14,2.0), (8.7,4.0), (9.2,6.0), (9.85,8.0), (10.85,10.0), (12.1,12.0), (14,13.8); or (4.0,.04), (6.0,.63), (7.0,1.6), (7.74,3.0), (8.1,4.0), (8.73,6.0), (9.5,8.0), (10.6,10.0), (12.03,12); or (4.0,.10), (6.0,1.18), (6.76,2.0), (7.65,4.0), (8.33,6.0), (9.2,8.0), (10.35,10.0), (12.0,12.0), (13.0,12.7), (14.0,13.1), (15.0,13.15); or a set of points proportionate thereto respectively, wherein for each coordinate point the first figure within the parenthesis represents the ordinate giving the strength of the front surface in diopters, and the second figure within the parenthesis represents the abscissa giving the strength of the whole lens in diopters, both for the reduced lens, substantially as described.

27. A meniscus correcting lens as in claim 26 in which the mean index of refraction for the $d$ line is approximately 1.52.

28. A meniscus correcting lens as in claim 26 in which the ordinants of the coordinate points of the graphs are algebraically increased by 0.2 times the number of hundredths over and above 152 hundredths in the value of the mean index of refraction for the $d$ line.

29. An optical system as in claim 1 in which the focal length of the correcting lens is such that its strength is not more than $\frac{1}{16}$th diopter different from that for which the focal length equals the object distance.

30. An optical system as in claim 7 in which the focal length of the correcting lens is such that its strength is not more than $\frac{1}{16}$th diopter different from that for which the focal length equals the object distance.

31. A meniscus correcting lens as in claim 25 in which the focal length of the correcting lens is such that its strength is not more than $\frac{1}{16}$th diopter different from that for which the focal length equals the object distance.

32. An optical system as in claim 1 in which the focal length of the correcting lens is such that its strength is not more than $\frac{1}{8}$th diopter different from that for which the focal length equals the object distance.

33. An optical system as in claim 7 in which the focal length of the correcting lens is such that its strength is not more than $\frac{1}{8}$th diopter different from that for which the focal length equals the object distance.

34. A meniscus correcting lens as in claim 25 in which the focal length of the correcting lens is such that its strength is not more than $\frac{1}{8}$th diopter different from that for which the focal length equals the object distance.

35. An optical system as in claim 1 in which the focal length of the correcting lens is not more than 20% different from the object distance.

36. An optical system as in claim 7 in which the focal length of the correcting lens is not more than 20% different from the object distance.

37. A meniscus correcting lens as in claim 25 in which the focal length of the correcting lens is not more than 20% different from the object distance.

38. An optical system as in claim 1 in which the focal length of the correcting lens is not more than 50% different from the object distance.

39. An optical system as in claim 7 in which the focal length of the correcting lens is not more than 50% different from the object distance.

40. A meniscus correcting lens as in claim 25 in which the focal length of the correcting lens is not more than 50% different from the object distance.

41. A meniscus correcting lens as in claim 26 together with an anamorphosing unit in front of which the lens is positioned, thereby to reduce the astigmatism of oblique rays passing through the anamorphosing unit, substantially as described.

HARRY SIDNEY NEWCOMER.